United States Patent [19]
Pestel et al.

[11] Patent Number: 6,089,179
[45] Date of Patent: Jul. 18, 2000

[54] MIXED HULL INFLATABLE CRAFT CONVERTIBLE INTO A CLOSED BOX

[75] Inventors: Dominique Pestel, Courbevoie; Bernard Franchetti, Le Vernet, both of France

[73] Assignee: Zodiac International, Issy les Moulineaux, France

[21] Appl. No.: 09/291,082

[22] Filed: Apr. 14, 1999

[30] Foreign Application Priority Data

Apr. 15, 1998 [FR] France ................................ 98 04672

[51] Int. Cl.⁷ .................................................. B63B 7/06
[52] U.S. Cl. ................................. 114/345; 114/361
[58] Field of Search ........................... 114/345, 352, 114/361

[56] References Cited

U.S. PATENT DOCUMENTS

| 4,597,355 | 7/1986 | Kirby ........................................ 114/345 |
| 4,779,555 | 10/1988 | Hong . |
| 4,811,682 | 3/1989 | Hwang et al. . |
| 5,819,682 | 7/1986 | Pestel ........................................ 114/345 |

FOREIGN PATENT DOCUMENTS

| 0193874 | 9/1986 | European Pat. Off. . |
| 0370668 | 5/1990 | European Pat. Off. . |
| 1196140 | 11/1959 | France . |
| 1407208 | 6/1965 | France . |
| 2162131 | 1/1986 | United Kingdom . |
| WO 94/23990 | 10/1994 | WIPO . |

*Primary Examiner*—Sherman Basinger
*Attorney, Agent, or Firm*—Dean W. Russell; Kilpatrick Stockton LLP

[57] ABSTRACT

A mixed hull inflatable craft convertible into a closed box for its storage or transport is disclosed. The hull has a rigid body (1) with a top edge (5), a plane to which is fixed an inflatable buoyancy tube (7), a rigid closing panel corresponding in contour to the edge and an inverted U-shaped profile (15) interlocking the tube to the hull. The profile overlaps the top edge (5) of the body and has a first groove (16) open upwards and inside the body, retaining a ring (18) carried by a flexible skirt (19) connected to the tube; a second groove (20) open upwards and outside the body, receiving the edge of the panel closing the body (1) in the closed box conformation and supporting the flexible skirt (19) of the inflated tube located outside the body in the craft conformation; and an elastomer bead (21) located on the outside under the second groove (20) forming a sealed bearing surface for the inflated tube (7) in the craft conformation.

7 Claims, 3 Drawing Sheets

MIXED HULL INFLATABLE CRAFT CONVERTIBLE INTO A CLOSED BOX

The present invention concerns improvements made to mixed hull inflatable craft convertible into closed boxes for their storage and/or transport, having a rigid body whose top edge extends approximately in one plane, an inflatable buoyancy tube fixed by interlocking means to said top edge of the rigid body with the exception of the rear of the latter, a rigid panel being furthermore provided and shaped to correspond in contour to said top edge of the body so as to constitute a closing element of the body inside which the deflated tube is folded.

It is known, according to patent application FR 97 03 266, that there is a craft as above-mentioned which, by its general arrangement, satisfies the desired aim of ease of storage and transport by car, at the same time as a fast and uncomplicated switch from the storage and transport conformation to the sailing conformation and vice versa.

A crucial problem in this type of craft is to provide a reliable watertightness between the rigid body and the inflated tube, in sailing conformation, so as to prevent the water entering the rigid body by passing between the latter and the tube.

Another problem lies in the manner in which the inflatable tube is connected to the rigid body so that the switch from one conformation to the other can be carried out without removing/refitting the tube from/on the body, in other words leaving the tube permanently interlocked with the body (the possibility of removal being reserved for maintenance, in the workshop) and tipping it to one side or the other of the body as necessary (inside for storage/transport, outside for inflation and sailing). The invention substantially aims to propose a simple technical solution likely to satisfy simultaneously various requirements posed by practise.

To these ends, an inflatable craft as mentioned in the preamble, being arranged in accordance with the invention, is characterised in that the above-mentioned interlocking means comprise a profile presenting a generally inverted U-shaped section, overlapping the top edge of the body and having:

a first groove open upwards, located inside the body, shaped with a narrow opening to retain a ring rigidly locked with said tube, said ring being carried by a flexible skirt connected to the tube, a second groove open upwards, located outside the body, likely to receive the edge of the above-mentioned rigid panel placed next to the body in the closed box conformation and likely to support the flexible skirt of the inflated tube located outside the body in the craft conformation, and an elastomer bead located on the outside under the second gutter so as to constitute a sealed bearing surface for the inflated tube in the craft conformation.

Thus, the profile can be made of a rigid material (aluminium, plastic), but presenting however a relative longitudinal deformability in order to be able to correspond in contour to the rigid body. This profile strengthens and protects the top edge of the body.

The manner of fixing of the inflatable tube by a groove and ring arrangement is well-known in the field of mixed hull craft: it is simple, mechanically strong and reliable. Since this groove is located by the top edge of the body and is open upwards, the inflatable tube can easily be tipped from inside the body to outside or vice versa; because of the general conformation of the tube, tipping from inside to outside can be caused simply by the inflation of the tube folded inside the body and whose shaping under the action of the inflation pressure is sufficient to cause it to go over the top edge of the body, without handling.

The seal between body and tube is obtained simply by the bearing of the inflated tube against the elastomer bead supported on the outside by the profile, the general conformation of the tube and its pressurisation being sufficient to provide the bearing likely to prevent water from entering. Furthermore, even if water succeeded in passing between body and tube, the second groove, normally provided to receive the edge of the cover and topped, in sailing conformation, by the connecting skirt of the inflated tube, serves as a drain trough taking the infiltrated water towards a drainage point.

Finally, the presence of the second groove provided in order to receive the edge of the closing panel in storage/transport conformation provides reliable securing of said panel all around the body and gives the assembly a good seal permitting, for example, the transport of the closed assembly on the roof of a car.

It is advantageous to take advantage of the presence of the profile topping the top edge of the rigid body to include on said profile a third groove located on the inside under the first groove and shaped to receive accessories or accessory support parts, such as removable seats, hooking sockets, etc.

Preferably, the profile is interlocked by discontinuous assembly means (screws, rivets) with the top edge of the body.

In one possible embodiment, for the fixing of the bead, the profile has on the outside two side wings spaced apart and L-shaped at right angles to each other and the bead has in its opposite sides two slots likely to receive the two wings of the profile. In practice, it is preferable for the straight section of the bead to present a convex external profile so that the inflated tube remains in sealed bearing against said bead even if it undergoes small vertical movements in relation to the body.

The invention will be better understood from a reading of the detailed description which follows of some preferred embodiments given only as non-limiting examples. In this description, reference is made to the attached drawings on which:

Figure 2:
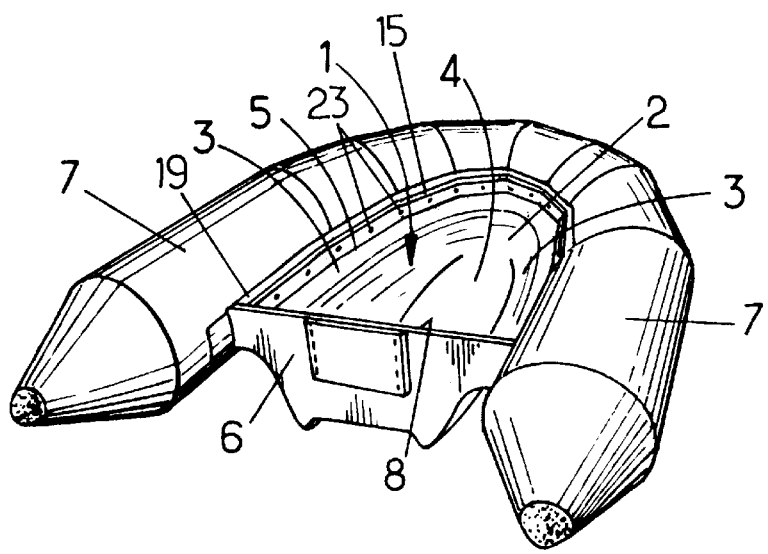
FIG. 2 is a perspective view of the same craft in its mixed hull inflatable craft conformation ready for sailing.

Referring firstly to FIG. 2, the set of elements constituting a craft referred to by the invention comprises a rigid tub 1, of elongated general shape, made of any appropriate material, particularly synthetic material used for the production of rigid mixed hull craft bodies.

Figure 1:
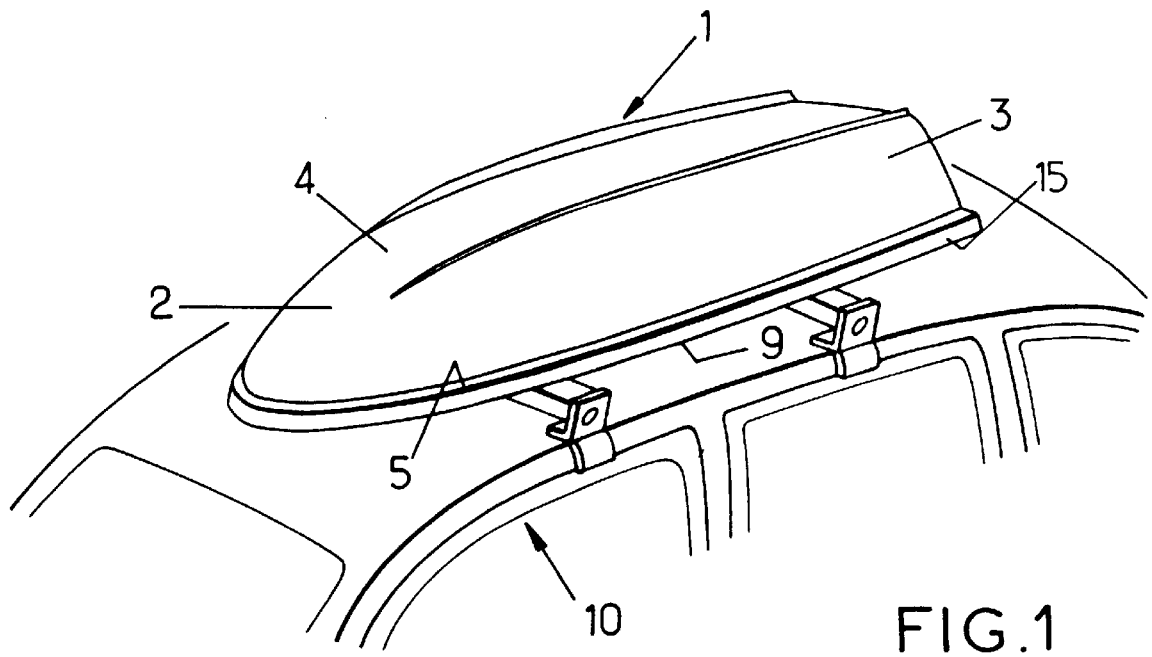
FIG. 1 is a perspective view illustrating the craft referred to by the invention in its closed box conformation installed and secured on the roof of a car.

One of the ends of the tub 1 is profiled both horizontally (the side edges 3 joining progressively) and vertically (the bottom 4 rising progressively up to the peripheral edge 5 of the tub), as best seen on FIG. 1 on which the tub 1 appears upturned.

The other end of the tub 1 is closed by a partition 6 approximately at right angles to the longitudinal axis of the tub.

The tub thus constituted is therefore likely to form a rigid body whose first end 2 constitutes the front and whose second end constitutes the rear with the transverse partition 6 which constitutes a transom for example likely to support an outboard motor (not shown on FIGS. 1 and 2).

Along the side and front edges of the tub 1 is fixed an elongated inflatable body 7 in flexible material with a general tube shape, which constitutes an inflatable buoyancy body having the general conformation of a U open towards the rear. The fixing of the inflatable body 7 to the edge of the rigid body or tub 1 is obtained by means of a ring/gutter system according to a technique known for traditional semi-rigid craft and which is discussed below.

The inflatable body 7 can be designed and shaped in a similar manner to the inflatable body of a traditional mixed craft, as can be seen in FIG. 2. Similarly, the transom constituted by the transverse partition 6 can be arranged and shaped in the same manner as a transom of a traditional inflatable craft.

Figure 3:
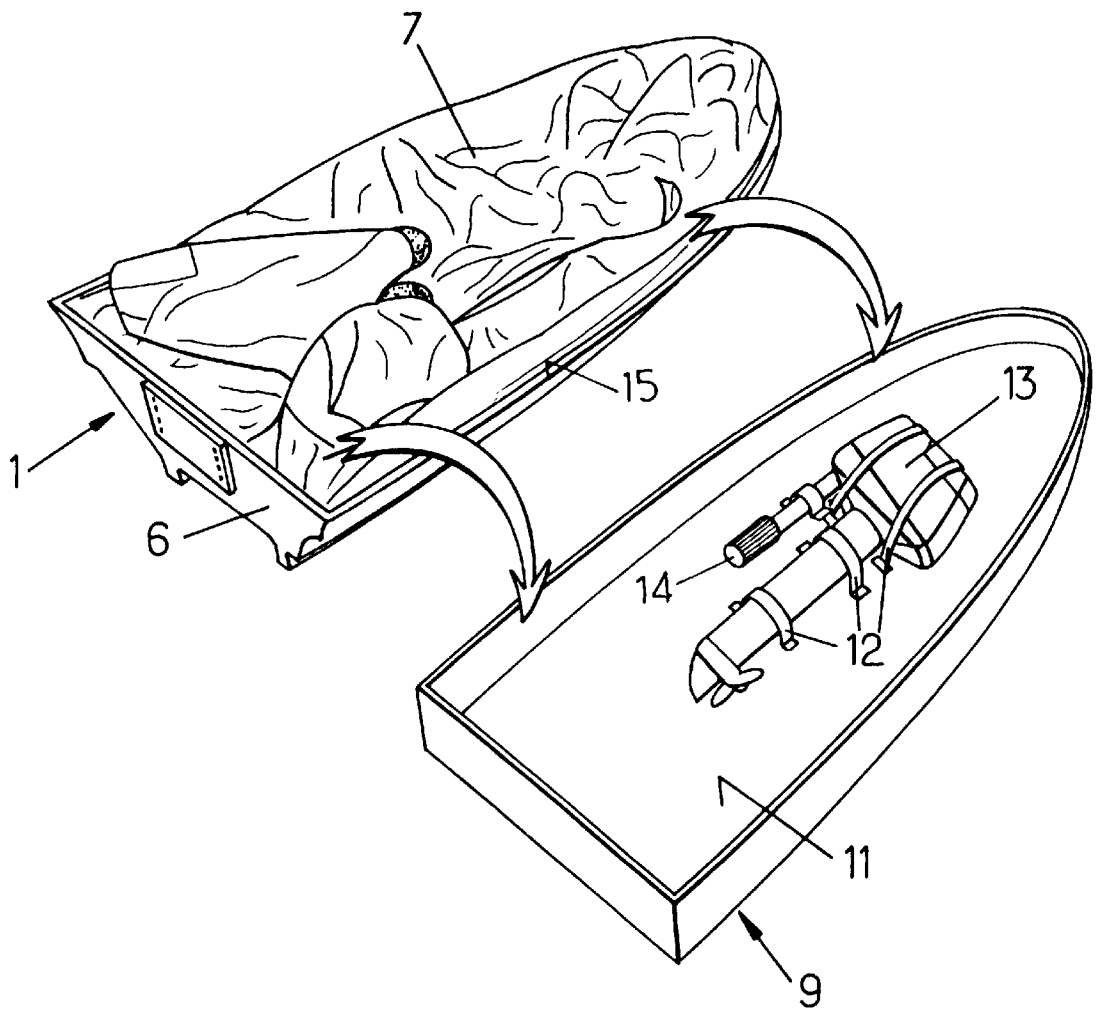
FIG. 3 is a perspective view of the craft of the invention in an intermediate arrangement, with the inflatable body emptied and folded in the tub and with the cover panel removed.

Finally, as can be seen in FIG. 3, also provided is a removable rigid panel 9, made for example from the same material as the tub 1, which presents a peripheral contour corresponding to that of the peripheral edge of the tub 1 and which constitutes a closing panel for closing off the tub 1.

The contour of the top edge of the rigid body and transom extends approximately in one plane, so as to facilitate assembly with the rigid panel 9.

All of the elements which have just been described can be arranged in two different functional conformations.

It is possible to produce a transport and storage conformation, illustrated in FIG. 1, in which the inflatable body 7 is deflated and folded inside the rigid tub 1 (this configuration can be seen in FIG. 3). The tub 1 is then arranged in an upturned position on the rigid panel 9 forming a bottom cover and locked on the latter with the help of attachment means, preferably of the quick-release coupling type (not shown on the Figures). In this position, the edge of the panel 9 corresponds in shape to the edge of the tub 1. An outboard motor 13 can be interlocked with the inner face 11 of the rigid panel 9, after its control lever 14 has been folded or removed, with the help of straps 12 and/or with the help of the motor's own cylinders screwed on an appropriate projecting embossment of the panel 9.

One thus constitutes a closed box which facilitates the storage of the craft and the protection of the deflated tube, and in addition, more advantageously, which is suitable for being arranged and fixed on the roof of a car 10, as shown in FIG. 1. The shape of the hull 1, arranged with the prow 2 facing forwards in the direction of travel of the car, is aerodynamically appropriate. The general shape of the box thus constituted is close to that of a car roof luggage box and its design is similar.

It is also possible to produce a sailing conformation, illustrated in FIG. 2, in which the rigid panel 9 is detached and separated from the tub 1. The inflatable body 7 is inflated for its shaping around the tub 1 which then constitutes a rigid body, the whole of the tub 1 and inflatable body 7 constituting a mixed hull.

Figure 4:
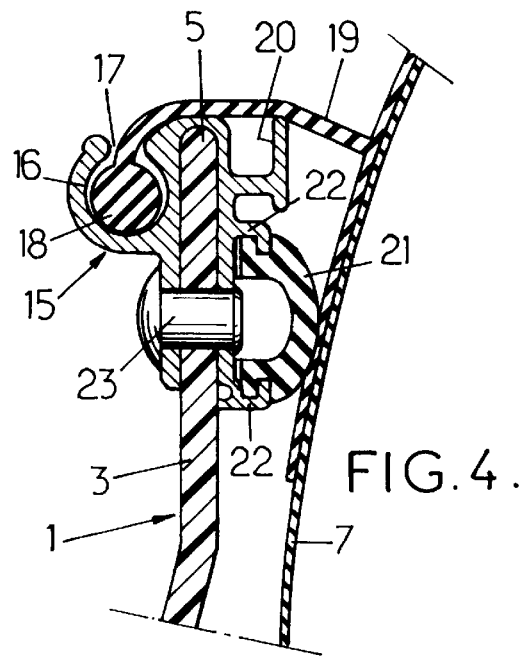
FIGS. 4 and 5 are larger scale views, in cross section, of a profile complying with the invention likely to equip the craft of FIGS. 1 to 3 and shown respectively in the two conformations of the craft.

In accordance with the invention, one equips the top edge of the rigid body 1 with a rigid profile 15 (in aluminium or plastics material) which is illustrated on an enlarged scale in FIG. 4. The profile 15 presents a generally inverted U-shaped section which overlaps the top edge 5 of the rigid body 1.

The profile 15 has a first groove 16, open upwards and located inside the body 1. The groove 16 is shaped with a longitudinal opening 17 narrower than the groove base which can be rounded. In the groove 16 there is engaged a ring 18, of cross-sectional size greater than the width of the opening 17 of the groove, which follows the free edge of a flexible skirt 19 connected radially to the inflatable tube 7.

The profile 15 has a second groove 20, also open upwards, which is located outside the body 1. The groove 20 is shaped to receive a peripheral edge of the above-mentioned closing panel 9; in the example in FIG. 1, the forged piece 20 has a rectangular cross-sectional contour, but any other desirable shape could also be used.

Finally, outside and under the second groove 20, the profile supports an elastomer bead 21 which is convex with its convexity facing outwards. In order to retain this bead 21, the profile can have two wings 22 projecting sideways, spaced apart and L-shaped at right angles to each other; the bead 20 has on its side two longitudinal slots in its opposite sides and likely to receive said two wings of the profile.

The profile 15 is interlocked with the edge of the body either by sticking, or as illustrated with the help of discontinuous assembly means such as screws or rivets 23.

In the sailing conformation illustrated in FIG. 4, the tube 7 is inflated and is hanging from the top edge of the rigid body 1 by means of the skirt 19 which follows the top contour of the profile 15. Thus hooked, the inflated tube 7 takes its bearing laterally against the bead 21, this bearing surface being in principle sealed. If water manages to enter between the bead 21 and the tube 7 and reaches under the skirt 19, it is collected in the groove 20 which then serves as a drain and evacuates it towards a discharge hole.

Figure 5:
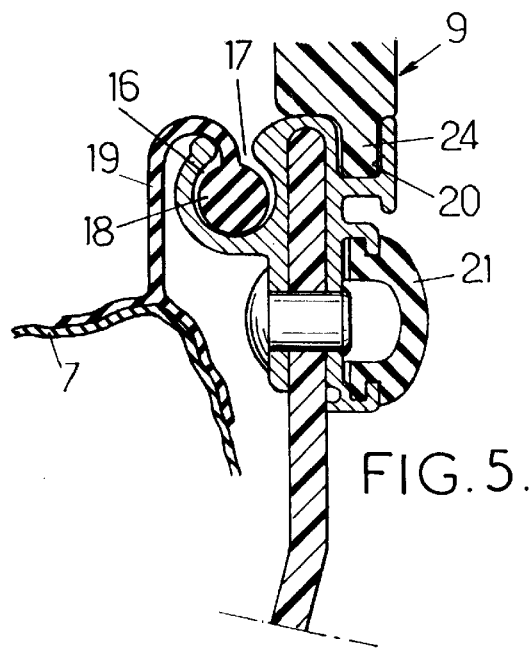

In the storage and transport conformation illustrated in FIG. 5, the deflated tube 7 has been folded inside the body 1 by turning the skirt 19 around the ring 18 which remains in place in the groove 16. The closing panel 9 is put in place to close off the tub constituted by the rigid body 1; the edge of the panel can advantageously present a projecting rib 24 which fits into the second groove 20.

Figure 6:
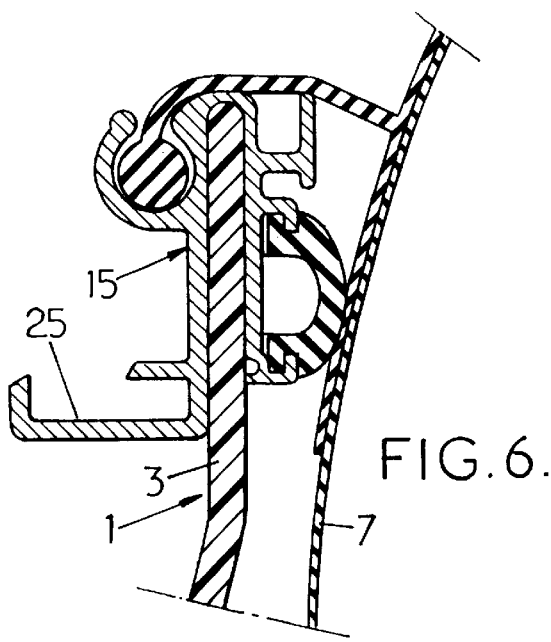
FIG. 6 illustrates a variant of the profile of FIGS. 4 and 5.

In FIG. 6 there is represented a variant of the profile of FIGS. 4 and 5. The profile here presents a third groove 25, located inside the body 1, which is shaped to receive accessories or parts of accessories such as a removable bench seat, a hooking socket, etc.

Figure 7:
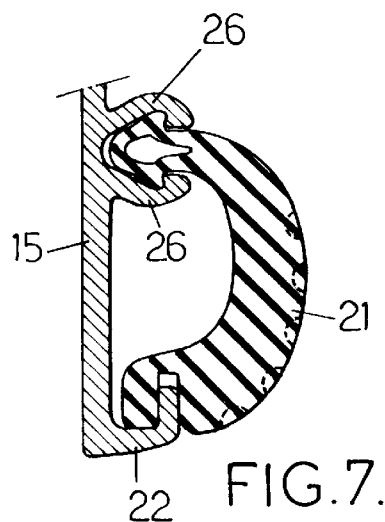
FIG. 7 illustrates, in an enlarged partial view, a variant of FIG. 6.

In FIG. 7 there is illustrated a variant conformation of the sealing bead 21 and profile 15, which presents an L-shaped bottom wing 22 which can fit into a slot on the bead 21, as indicated above. On the other hand, on the top, the profile has two wings 26 facing each other defining a gutter with a narrowed longitudinal opening in which can be fitted the other edge of the bead 21 and shaped with retaining shoulders and crushable so as to be able to be fitted and retained in said gutter.

What is claimed is:

1. Mixed hull inflatable craft convertible into a closed box for its storage and/or transport, having a rigid body (1) whose top edge (5) extends approximately in one plane, an inflatable buoyancy tube (7) fixed by interlocking means to said top edge of the rigid body with the exception of the rear of the latter, a rigid panel (9) being furthermore provided and shaped to correspond in contour to said top edge of the body (1) so as to constitute a closing element of the body inside which the deflated tube (7) is folded, characterised in that the above-mentioned interlocking means comprise a profile (15)

presenting a generally inverted U-shaped section, overlapping the top edge (5) of the body and having:

a first groove (16) open upwards, located inside the body, shaped with a narrow opening (17) to retain a ring (18) rigidly locked with said tube (7), said ring being carried by a flexible skirt (19) connected to the tube, a second groove (20) open upwards, located outside the body, likely to receive the edge (24) of the above-mentioned rigid panel (9) placed next to the body (1) in the closed box conformation and likely to support the flexible skirt (19) of the inflated tube located outside the body in the craft conformation, and an elastomer bead (21) located on the outside under the second groove (20) so as to constitute a sealed bearing surface for the inflated tube (7) in the craft conformation.

2. Craft according to claim 1, characterised in that the profile has a third groove (25) located on the inside under the first groove and shaped to receive accessories or accessory support parts.

3. Craft according to claim 1, characterised in that, for the fixing of the bead (21), the profile (5) has two side wings (22) spaced apart and L-shaped at right angles to each other and in that the bead (21) has in its opposite sides two slots likely to receive the two wings (22) of the profile.

4. Craft according to claim 1, characterised in that the profile (15) is interlocked by discontinuous assembly means (23) with the top edge (5) of the body.

5. Craft according to claim 1, characterised in that the bead (21) has a straight section which has a convex external profile.

6. Craft according to claim 1, characterised in that the profile (15) is in aluminium.

7. Craft according to claim 1, characterised in that the profile (15) is in rigid plastics material.

\* \* \* \* \*